(12) United States Patent
Kadowaki

(10) Patent No.: US 7,529,696 B2
(45) Date of Patent: May 5, 2009

(54) FOREIGN HOME-DELIVERY TRANSPORT SYSTEM AND METHOD

(75) Inventor: Kiyonori Kadowaki, Kyoto (JP)

(73) Assignee: SG Holdings Co., Ltd., Kyoto-shi (JP)

( * ) Notice: Subject to any disclaimer, the term of this patent is extended or adjusted under 35 U.S.C. 154(b) by 1318 days.

(21) Appl. No.: 10/362,363

(22) PCT Filed: Aug. 31, 2001

(86) PCT No.: PCT/JP01/07549

§ 371 (c)(1),
(2), (4) Date: Feb. 27, 2003

(87) PCT Pub. No.: WO02/18246

PCT Pub. Date: Mar. 7, 2002

(65) Prior Publication Data

US 2003/0182148 A1    Sep. 25, 2003

(30) Foreign Application Priority Data

Aug. 31, 2000    (JP) ............................. 2000-263955

(51) Int. Cl.
  *G06Q 10/00*   (2006.01)
  *G06G 1/14*    (2006.01)
  *G06Q 20/00*   (2006.01)
(52) U.S. Cl. ......................................... 705/28; 705/22
(58) Field of Classification Search ....................... None
    See application file for complete search history.

(56) References Cited

U.S. PATENT DOCUMENTS 5,038,283 A  *  8/1991  Caveney ..................... 705/28

| | | | |
|---|---|---|---|
| 5,292,004 A | | 3/1994 | Cesarini |
| 5,631,827 A | * | 5/1997 | Nicholls et al. ................ 705/28 |
| 6,192,400 B1 | * | 2/2001 | Hanson et al. .............. 709/217 |
| 6,246,998 B1 | | 6/2001 | Matsumori |
| 2005/0171871 A1 | * | 8/2005 | Mizushima et al. ........... 705/28 |
| 2006/0074774 A1 | * | 4/2006 | Estes et al. ..................... 705/26 |

(Continued)

FOREIGN PATENT DOCUMENTS

DE    43 30 254 A1    6/1994

(Continued)

OTHER PUBLICATIONS

Quinn, Francis J. "What's New For Airfreight Shippers?", Traffic Management, vol. 33, No. 1, p. 57, Jan. 1994.*

(Continued)

*Primary Examiner*—Matthew S. Gart
*Assistant Examiner*—John Shin
(74) *Attorney, Agent, or Firm*—Oblon, Spivak, McClelland, Maier & Neustadt, P.C.

(57) ABSTRACT

An overseas delivery and transport system includes a server, an overseas main terminal, and a domestic main terminal. The overseas main terminal reads identification information, receives predetermined information of a consignee related to the identification information from the servers, allocates the predetermined information to common label data, and sends the common label data to the server. The domestic main terminal reads an identification code written on an air waybill, and allocates a sign indicating an additional tax to the common label data. The server stores the consignee information written in the domestic language corresponding to the identification information.

11 Claims, 14 Drawing Sheets

U.S. PATENT DOCUMENTS

2006/0178994 A1* 8/2006 Stolfo et al. .................. 705/50
2008/0040144 A1* 2/2008 Riggs et al. .................... 705/1

FOREIGN PATENT DOCUMENTS

| JP | 8-244950 | 9/1996 |
|---|---|---|
| JP | 10-162066 | 6/1998 |
| TW | 00393617 | 6/2000 |

OTHER PUBLICATIONS

Forster, Paul W.; Regan, Amelia C. "Electronic Integration in the Air Cargo Industry: An Information Processing Model of On-Time Performance". Transportation Journal, vol. 40, No. 4, pp. 46-61, Summer 2001.*

Manaya Takada: "Seryaku network no kenkyu; federal express" Nikkei Communication, vol. 299, pp. 109-114 Aug. 2, 1999.
Toshio Takizawa et al.: "Unyu-you nishu taiou system" Oki Denki Kenkyuu Kaihatsu, vol. 59, No. 2 Apr. 1, 1992.
Mitsue Satake: "Solution sai-zensen dai 10kai; takuhaibin" Nikkei Comute, No. 387, pp. 163-169 Mar. 18, 1996.
Manaya Takada: "Seryaku network no kenkyu; federal express" Nikkei Communication, vol. 299, pp. 109-114 Aug. 2, 1999.
Toshio Takizawa et al.: "Unyu-you nishu taiou system" Oki Denki Kemkyuu Kaihatsu, vol. 59, No. 2 Apr. 1, 1992.
Mitsue Satake: "Solution sai-zensen dai 10kai; takuhaibin" Nikkei Comute, No. 387, pp. 163-169 Mar. 18, 1996.

* cited by examiner

FIG. 2

| ご依頼主 Address/Name | | | |
|---|---|---|---|
| Phone| | | |
| パスポート番号 Passport No. | | | |
| お問い合わせ No. Reference No. | 166-2911342 | | |
| Pick Up Location | | | |
| Pick Up Date | | | |
| TEL# | | | |
| □ 別送品 Destination Cargo | | | |
| □ 忘れ物 Things Left Behind | | | |
| □ 一般貨物 Ordinary Cargo | | | |
| □ FHD | | | |
| REF | | | |

XX EXPRESS

| 郵便番号/Postal Code | Date | / / | 個数 梱数 / 重量 Weight |
|---|---|---|---|
| お Address/Name 届け先 | | | kgs |
| Phone | | | |
| 梱包予定日 Arrival Date | 運送保険 Shipment Insurance □ 加入します Yes | 保険 Sum 金額 Insured | |
| 運送費 Freight US$ | 梱包費 Packing US$ | 保険料 Insurance US$ | 合計 Total US$ |
| ドライバーサイン Driver's Signature | | | |
| メッセージ Message | | | |

Ai

FIG.5A
USER FILE Mi
(TELEPHONE DIRECTORY DB/ZIP CODE MASTER) M1

| TELEPHONE NUMBER | 03-3504-3075 |
| ZIP CODE | 100 |
| ADDRESS | JAPANESE |
| NAME | JAPANESE |
| DESTINATION STORE CODE | 3-1 |

M2

FIG.5B
AIR WAYBILL FILE (ENGLISH/ROMAN CHARACTER) aip1

| AIR WAYBILL NUMBER ai | 782-7211936 |
| CONSIGNOR'S NAME | |
| CONSIGNOR'S TELEPHONE NUMBER | |
| CONSIGNEE'S NAME (COMPANY NAME) | |
| CONSIGNEE'S ADDRESS | |
| CONSIGNEE'S NAME | |
| CONSIGNEE'S TELEPHONE NUMBER | | aip2

FIG.5C
COMMON LABEL FILE (HIT) bk1

| AIR WAYBILL NUMBER ai | 782-7211936 |
| DESTINATION STORE CODE | |
| CONSIGNOR'S NAME | JAPANESE |
| CONSIGNEE'S NAME (COMPANY NAME) | JAPANESE |
| CONSIGNEE'S TELEPHONE NUMBER | |
| CONSIGNOR'S NAME (COMPANY NAME) | ENGLISH |
| CONSIGNEE'S ADDRESS | ENGLISH |
| CONSIGNOR'S TELEPHONE NUMBER | | bk2

| 366-7211693 | Air Waybill | | | |
|---|---|---|---|---|
| KURABUKUATORO 1-9-1 SHINSAIBASHISUJI CHUUOUKU OOSAKASHI OSAKA | Remarks<br>FREE HOUSE | | | |
| HNL INT'L ZIRPORT HNL-KIX | | | | |
| KIX | JAL | 123-456 8901 | HKD ☐ ☒ | $900.00 |

CARGO MANIFEST

| MASTER AWB NO. | PORT OF DISCHARGE |
|---|---|
| 123-4567 8901 | KANSAI AIRPORT (KIX) |

MEMBER  OFFROAD EXPRESS 2224 ALAHAO PL. #202 HONOLULU, HAWAI 96819
LOT NO.  11           FLIGHT/DATE NO   JL712/02 JUN 2000
CONSIGNEE TO   X X TSUKAN KABUSHIKIGAISYA KANKUUEIGYOSHO 2-01 DAIRITENBIRU DAIITIKAMOTSU SENSYUKUKOMINAMI 1 BANCHI SENNANNSHI OSAKA (TEL)0724-56-5791 (FAX)

| HAWB NO | NO OF PKCS | WT IN LBS | COMMODITY | FINAL DEST. | NAME & ADD OF SHPR | NAME & ADD OF CNEE | TOTAL VALUE |
|---|---|---|---|---|---|---|---|
| 366-7211693 | 1 | 50 | TSHIRT BAG | KIX | ▓▓▓▓▓▓▓▓▓▓▓▓▓▓▓▓ | KURABUKUATORO 1-9-1 SHINSAIBASHISUJI CHUUOUKU OOSAKASHI OSAKA | HK$900.00 |

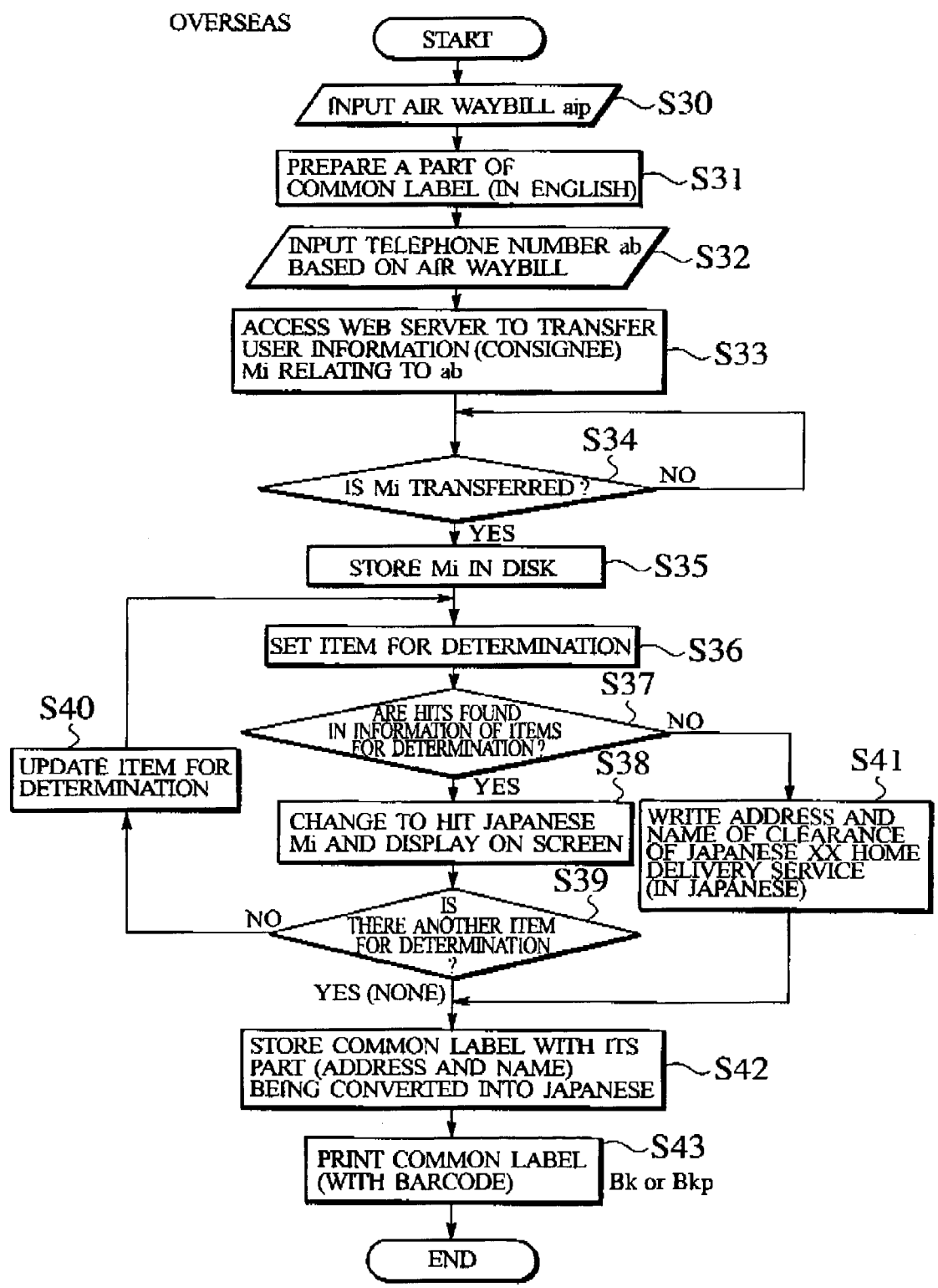

DESTINATION STORE CODE
(SPACE)

FOREIGN HOME-DELIVERY TRANSPORT SYSTEM AND METHOD

TECHNICAL FIELD

The present invention relates to an overseas delivery and transport system so that when a package is sent from a foreign country to a home country or from a home country to a foreign country, the package can be sent to a consignee in a short time.

BACKGROUND ART

In general, a delivery and transport management system in which packages of individual clients at overseas locations (also referred to as consignors) are transported to Japan is as follows. Namely, as shown in FIG. 1, for example, a consignor in Hawaii enters predetermined data into a foreign-to-home air waybill Ai and attaches the air waybill to a package 1. Then, the consignor calls a home delivery service company XX. The company transports the package 1 by an express vehicle.

As shown in FIG. 2, the foreign-to-home air waybill Ai is made of a plurality of sheets and includes a blank section for entering the client's name, address and telephone number, a blank section for passport number, a blank space for the receiver's address, a blank space for a reference number and a barcode (reference number). Titles for such blank spaces are written in the respective blank spaces in Japanese and English (Roman characters).

The predetermined data is entered in the blank spaces in the foreign-to-home air waybill Ai. Then, the air waybill is attached to the package 1 and the package is collected at a package collecting base at a region of Hawaii by an express vehicle. Thereafter, the package 1 is carried by another express vehicle to an overseas business base.

As shown in FIG. 1, the overseas business base is provided with a personal computer 2 (which is simply referred to as a PC 2 hereinafter), a label printer 3 and a printer 4 for entry papers on documents. These components are connected by a LAN. A barcode scanner 5 is connected to the PC 2.

When the package 1 is arrives at the overseas business base, an operator of XX home delivery service displays an input format for a label Bi on a screen of a display device and reads/scans a barcode on a copy Aip of the foreign-to-home air waybill Ai attached to the package 1, by the barcode scanner 5.

A reference number (also referred to as an air waybill number) of the barcode is displayed on a predetermined blank space in the input format for the label Bi on the screen. The operator inputs the receiver's (consignee's) address and telephone number and consignor's address and telephone number in English on the basis of the copy Aip of the foreign-to-home air waybill Ai. Then, by using the label printer 3, a label Bi as shown in FIG. 3 is printed and attached to the package 1. As shown in FIG. 3, a plurality of labels with MASTER-AMB and HOUSE-AMB being written therein are prepared as the label Bi.

A registered customs specialist at the overseas business base of the XX home delivery service displays a format for entry papers or documents for departure or shipment of the package on a screen, reads the copy Aip of the foreign-to-home air waybill Ai and inputs information necessary for shipment (including product's name, product type, price, number of packages, consignee's address, consignee's telephone number etc.) in English. By using the printer 4 for entry papers or documents, the entry papers Di for shipment (written in English) can be provided. The papers are sent to the customs office in Hawaii.

The package 1 with the foreign-to-home air waybill Ai and the label Bi being attached thereto is carried to an airplane and loaded therein. Then, a worker on the field takes copies of the entry papers Di for departure (hereinafter referred to as entry papers Dia used for departure) into an office and sends the papers by fax to the clearance office of the XX home delivery service in Japan.

The XX clearance office of the XX home delivery service in Japan has a personal computer 10 (simply referred to as a PC 10 hereinafter) and a printer 11 for entry papers. When the entry papers Dia used for departure from Hawaii are sent to Japan, a registered customs specialist in Japan operates the PC 10 and prepares entry papers Ei on the basis of the entry papers Dia used for departure.

When the package 1a has arrived, an operator in Japan operates the PC 10 and inputs predetermined information based on copies of the foreign-to-home air waybill Ai and the entry papers Ei for the package 1a (including consignee's name, address, telephone number and a destination office code etc.) into an input format for a domestic shipping label. Then, by using a printer 12, a domestic label Bia (a label written in Japanese shown in FIG. 3) is printed. The resultant label is attached to the package 1a. Provided a number on the label Bia (e.g., a destination office code) is a new domestic number.

The package 1aa with the domestic label Bia being attached thereto is carried to a branch office (a sending office) at a larger region in the country. Then, the package is carried from the sending office to a smaller region in the country (destination office) and then finally to the consignee.

In recent years, services have been provided for delivering marine products and meats produced in A country to consignees in Japan as direct shipping. In accordance with such services, for example, a large amount of marine products and meats are imported from the A country (many times packed in units of tens of the products) and stored in storehouses. When a request is provided from a consignee, these foods are packed again for the consignee. Then, a label with the consignee's address, name and telephone number being written therein is printed and attached to the package. Finally, the package is delivered.

In accordance with the above-described conventional system, as well as the label Bi for departure on shipping, the entry papers Di for departure or shipping are provided for the package 1 in the overseas business base of the XX home delivery service.

In Japan (entry side), the domestic label Bia is newly provided. Namely, every time when a package is sent to Japan, a new domestic label is provided.

The entry papers are individually provided in Japan and a foreign country even if a company has the same system in Japan and the foreign country and the entry papers for Japan and the foreign country have the same contents.

Namely, even if a company has the same system in Japan and a foreign country, (three in total) labels and entry papers are created in both of the foreign country and Japan. Thus, providing the entry papers takes a great amount of labor and time. As a result, the problem of increased costs arises.

Further, an operator sends copies of the entry papers used for departure on shipping by fax to Japan after the package 1a is loaded into an airplane. Thus, it takes much labor for the operator. Also the operator may forget to send the papers by fax.

In such case, after the airplane arrives, the entry papers used for departure on shipping are sent. Subsequent to the domestic entry papers being prepared, the label Bia is attached to the package and the package is delivered to a consignee. Thus, it takes a long time for the package to be received by the consignee.

Even if the entry papers used for departure on shipping are sent by fax, the entry papers must be prepared manually. Accordingly, when a large number of copies of the entry papers used for departure are sent by fax, a registered customs specialist must carry out a large number of operations. Thus, even when the package 1a arrives, the entry papers for the package may not have been prepared. As a result, it takes a long time for the package to be received by the consignee.

Especially, when a large number of packages have arrived, these packages must be stored in storehouses until entry papers and labels for earlier arrived packages are prepared. Thus, there arise problems in that an additional cost is incurred for storing the packages in storehouses and a longer time is required for a package to be received by a consignee.

A consignee desires to receive a package as soon as possible. Nevertheless, even if a company has the same system in a foreign country and Japan, labels must be created in both Japan and the foreign country. Further, entry papers are prepared from entry papers used for departure sent by fax. Thus, when a large number of packages arrive, it takes a long time for a package to be received by a consignee.

In accordance with services for delivering marine products and meats of A country to consignees in Japan by direct shipping, products must be re-packaged and stored in storehouses. Consequently, a cost is incurred for storing the packages in storehouses and much labor is required for packaging again, resulting in increased costs. Further, it takes a long time for a package to be received by a consignee.

DISCLOSURE OF THE INVENTION

The present invention has been devised in order to solve the aforementioned drawbacks, and an object of the present invention is to provide an overseas delivery and transport system capable of significantly shortening the time for a package to be delivered from a foreign country to a consignee in Japan. All examples relating to shipment of goods, by the present invention, are given as occurring between an English speaking country and Japan. However, the invention is applicable to shipment of goods between any countries, regardless of the language.

In accordance with the invention of claim 1, there is provided an overseas delivery and transport system which is located at an airport or a harbor, connects an overseas main terminal at an overseas business base and a domestic main terminal at a domestic business base to a server via a network, collects various types of data supplied from the overseas main terminal or the domestic main terminal, and provides the data to either of the main terminals.

The overseas main terminal or the domestic main terminal reads identification information for identifying a consignee written in an air waybill of a package, transfers predetermined information which is written in the domestic language or the overseas language and relates to the identification information from the server, allocates the predetermined information to label data used for transporting the package to the consignee, and prints the data as a label.

The server stores consignee information which corresponds to the identification information and is written into a domestic language or an overseas language, and provides the consignee information to either of the main terminals to which the identification information has been sent.

In accordance with the invention of claim 2, the overseas main terminal reads air waybill information of the package transported to the domestic country, sends the air waybill data to the server, and adds an identification code of the air waybill to data of entry papers used for departure to the domestic country prepared on the basis of the air waybill information, thereby sending the resultant data to the server.

The server associates the air waybill data from the overseas main terminal with the data of entry papers used for departure to store resultant data, and provides the air waybill data and the data of entry papers when the identification code of the air waybill is sent from the domestic main terminal.

In accordance with the invention of claim 3, when predetermined information which relates to the identification information for identifying a consignee and written in the domestic language is not transferred from the server, the overseas main terminal prepares a common label for the domestic business base to which address and name of the domestic business base are previously stored and written in the domestic language, and sends the common label for the domestic business base to the server.

In accordance with the invention of claim 4, the air waybill data, the common label data and the data of the entry papers are sent to the server when it is informed that the package has left the airport or the harbor.

In accordance with the invention of claim 5, the domestic main terminal includes: means for sending the identification code of the air waybill to the server, and for providing the air waybill data, the common label data, the data of the common label for the domestic business base and the data of entry papers used for departure relating to the identification code of the air waybill; and means for obtaining data of the common label for the correct consignee corresponding to consignee's address, name and a destination office code based on the air waybill information and written in a domestic language are allocated respectively to predetermined blank spaces in the common label, and for printing the resultant data for the data of common label for domestic business base.

In accordance with the invention of claim 6, the data of the common label for the correct consignee is sent to the server and newly stored therein as client data.

In accordance with the invention of claim 7, the domestic main terminal further includes means for, when it is informed that an additional tax must be paid by confirming the data of entry papers used for departure, allocating a sign indicating that an additional fee must be paid due to the additional tax to either of the common label data, and for printing the resultant data.

In accordance with the invention of claim 8, the server is a distributed database system which represents information in a hypertext format, and links the respective data by using pointers as the air waybill numbers, and each of the main terminals and the server conduct communication by TCP/IP protocol.

BRIEF DESCRIPTION OF THE DRAWINGS

FIG. 2 is an explanatory view of an air waybill.

FIGS. 5(*a*) through 5(*c*) are views for explaining various types of data stored in a web server.

FIG. 11 is an explanatory view of entry papers.

FIG. 12 is a flowchart explaining the operation of a common label preparing processing.

BEST MODE FOR CARRYING OUT THE INVENTION

Figure 1:
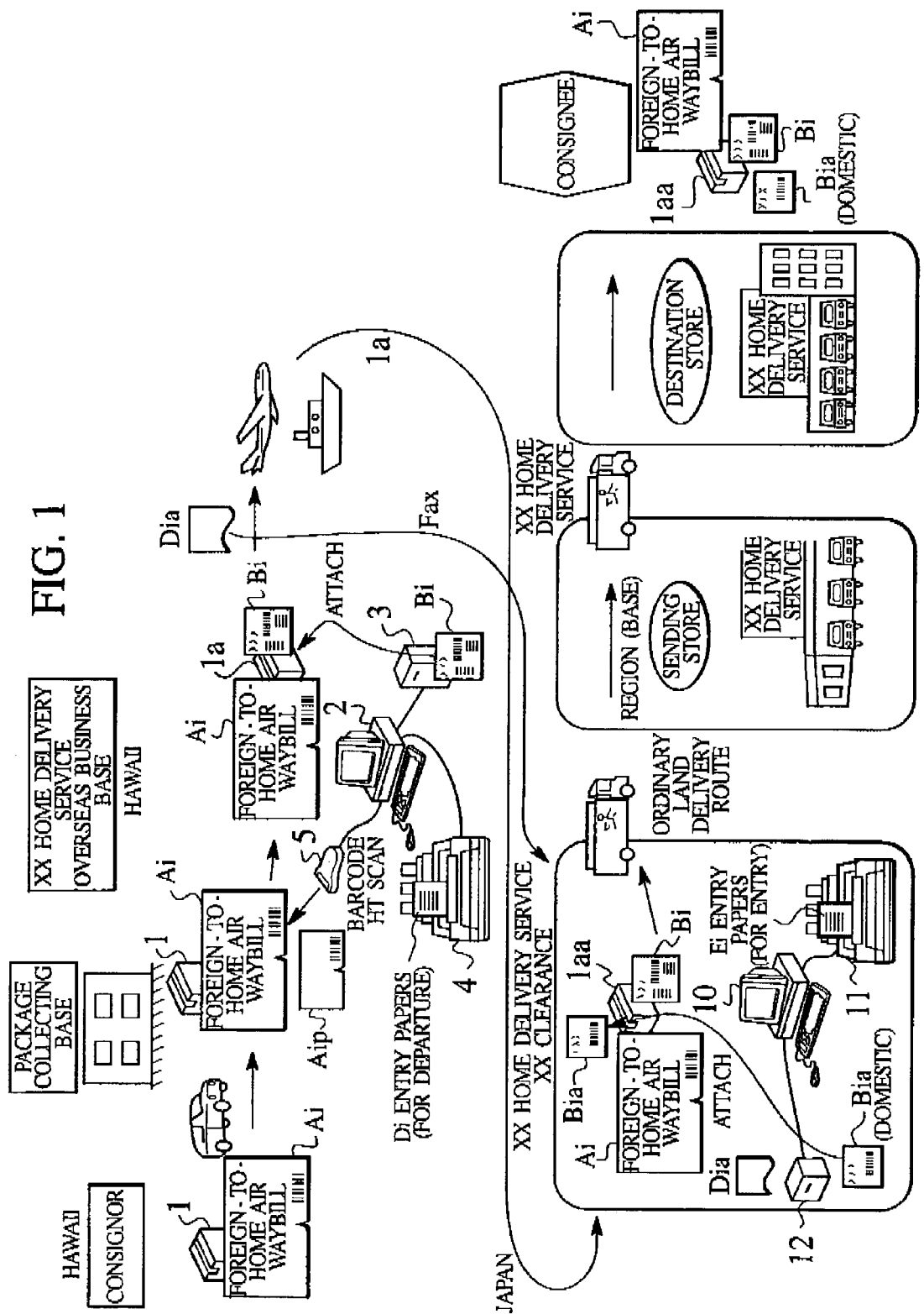
FIG. 1 is a structural view of a conventional system of delivery from overseas.
Figure 3:
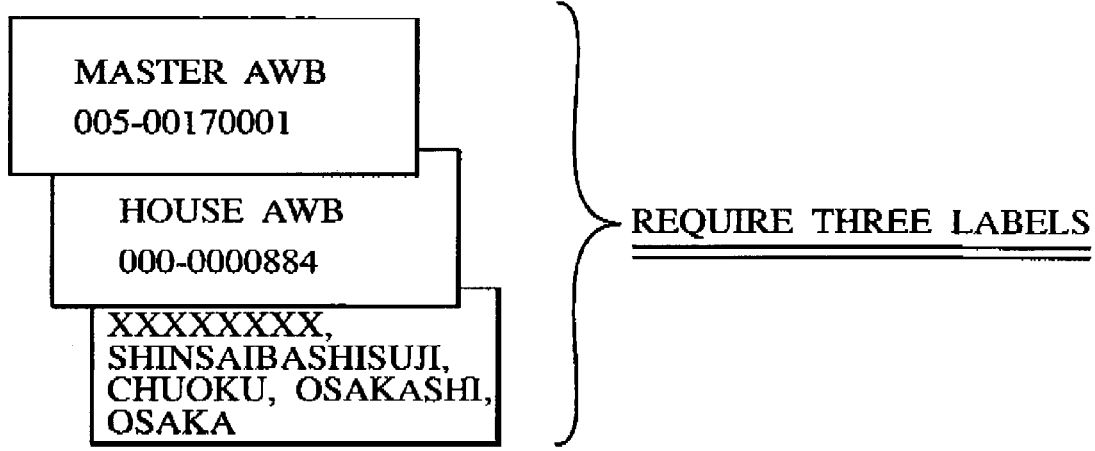
FIG. 3 is an explanatory view of a conventional label.
Figure 4:
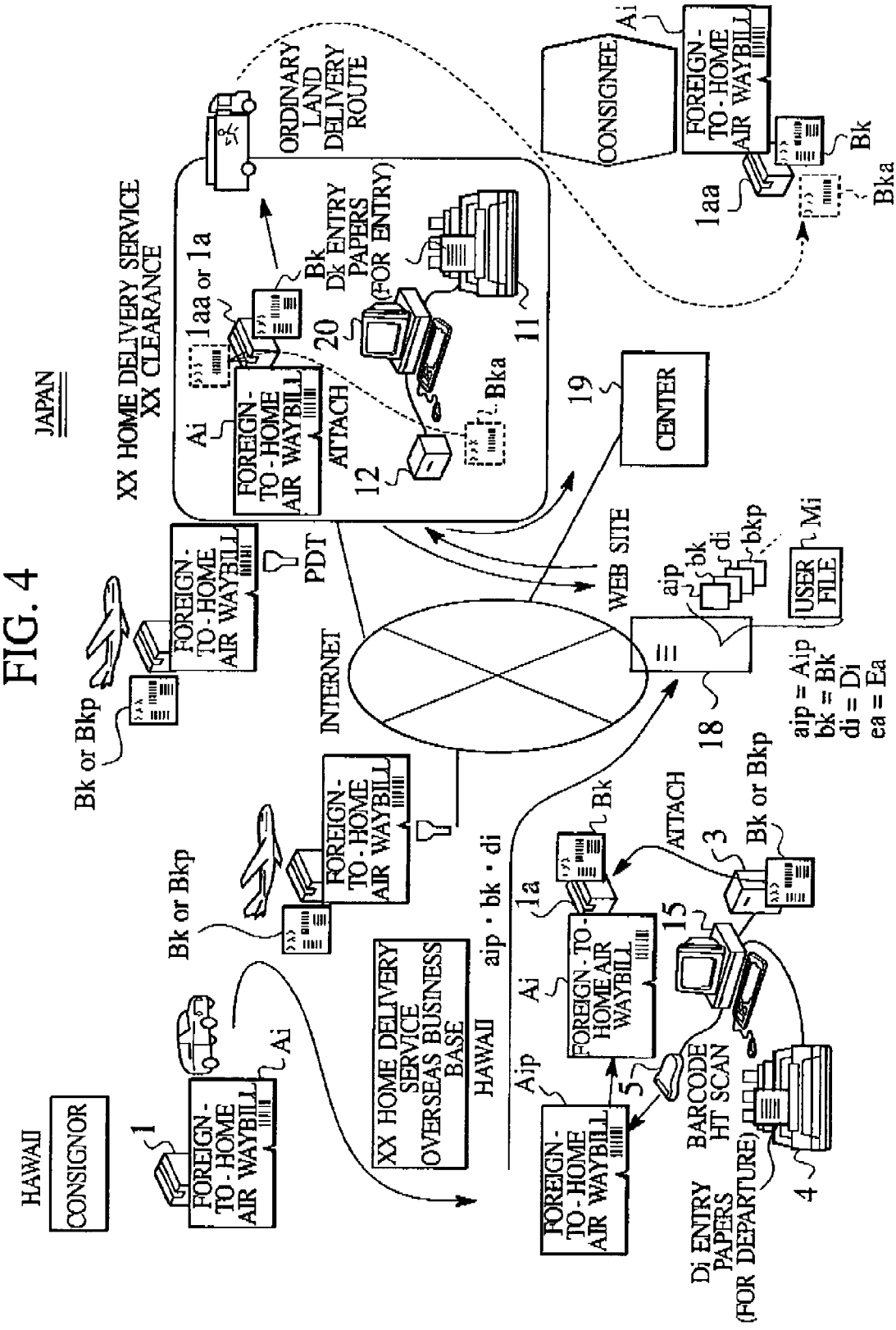
FIG. 4 is a schematic structural view of an overseas delivery and transport system of this embodiment.

FIG. 4 is a schematic structural view of a management system of delivery and transport of packages from overseas locations, as relate to the present invention. In accordance with this system, an overseas delivery driver collects a package 1 of an overseas consignor by a delivery vehicle to a package collecting base (not shown). Then, the package is carried from this package collecting base to an overseas business base of an XX home delivery service by another express vehicle. In the overseas business base, information of a copy Aip of a foreign-to-home air waybill Ai is inputted by an operator, so that a label Bk which is common to both of a foreign country and Japan (Bk or Bkp: Bk indicates a label when a hit is found and Bkp indicates a label when a hit is not found) is issued and entry papers or documents Di for departure are also issued.

Data bk (or bkp) of the common label Bk, data aip of the foreign-to-home air waybill Aip and data di of the entry papers Di for departure are sent to an internet Web server. An air waybill number ai (which is also referred to as an identification code for the air waybill) is attached to such data.

The clearance of the XX home delivery service in Japan accesses the Web server to display the data bk of the common label Bk, the data aip of the foreign-to-home air waybill Aip and the data di of the entry papers Di for departure on a screen and confirms the contents thereof. (If errors are found, they are corrected.) Then, formal entry papers Dk are provided.

Thus, the time for preparing a label and entry papers can be substantially reduced, so that a package can be delivered to a consignee in a shorter time.

If an additional tax is required, a new common label Bka on which payment on delivery which indicates that a consignee must pay an additional fee is printed is prepared and attached to a package 1a. The package with a common label being newly attached thereto is referred to as a package 1aa hereinafter.

The above-described delivery vehicle, the package collecting base and the express vehicle have a PDT (portable data terminal). When a package is received, a barcode (an air waybill number; which is also referred to as a reference number) on the package is scanned by a PDT and sent to the package collecting base. Workers at overseas and domestic airports have a PDT. When a package is loaded into an airplane or when a package is received at a domestic airport, a barcode on the package is scanned by a PDT and sent to an overseas business base and a domestic XX clearance center.

(Structure of Overseas Business Base)

As shown in FIG. 4, the overseas business base is provided with a PC 15 (which is also referred to as an overseas main terminal), a label printer 3 and a printer 4 for entry papers. Such components are connected with each other by a LAN. A barcode scanner 5 is connected to the PC 15. Also connected to the PC 15 is an unillustrated communication device (router or the like). The communication protocol used is TCP/IP (Transport Control Protocol/Internet Protocol).

When the package 1 arrives, an operator at the overseas business base of the XX home delivery service displays an input format for a label on a screen and reads a barcode on the copy Aip of the foreign-to-home air waybill Ai attached to the package 1, by the barcode scanner 5. On the screen, a reference number (also referred to as an air waybill number ai) of the barcode is displayed on a predetermined blank space in the input format for the label.

Then, the operator inputs, on the basis of the copy Aip of the foreign-to-home air waybill Ai, the receiver's (consignee's) address and telephone number, consignor's address (in English or Roman character), name (in English or Roman character) and telephone number ab etc. (that are generically referred to as air waybill data aip; or that are also referred to as air waybill information in a case of a label).

In accordance with the input of the air waybill data aip, user data Mi on the internet web server 18 relating to the telephone number ab (an example of identification information for identifying a consignee) is read. Then, a destination office code, consignee's address and name etc. existing in the user data Mi (or hitting in the user data Mi) are read and allocated to predetermined blank spaces (a blank for an address, a blank for a name and a blank for destination office code) in a common label on a screen determined. By using the printer 3, the common label Bk (when a hit is determined) is finally obtained. As used herein, the term "hit" is used to indicate that the computer search found or "hit" the information as requested.

When hits are not found with respect to the destination office code, the consignee's address and the consignee's name by using the telephone number ab in the air waybill information aip, in the PC 15, the address of the clearance center of the XX home delivery service in Japan is written into the blank for an address in the input format for the common label on a screen. The name of the clearance center of the XX home delivery service in Japan is written in the blank for the name. In this way, the common label Bkp (when a hit is not found) is prepared.

The PC 15 creates the entry papers Di used for departure at the overseas business base provided by the printer 4. Thus, the entry papers can be provided.

After it is confirmed that the package 1a has been loaded into an airplane at an overseas airport, the barcode on the air waybill Ai of the package 1a is scanned by a PDT, the air waybill number ai is sent and the PC 15 receives the number, the air waybill information aip, the common label data bk and the data di of entry papers are sent to the internet web server 18 as data to be accepted.

(Structure of Web Server 18)

The web server 18 is a distributed database system in which information is indicated in a hypertext format and enables information on an internet to be systematically obtained.

The aforementioned hyper text has a structure in which pointers are embedded in a text and jumping from these pointers to related information is possible. The information is described in HTML. By designating a point or a link for a server, successive jumping to new texts is possible and thus necessary information can be obtained.

Figure 6A:
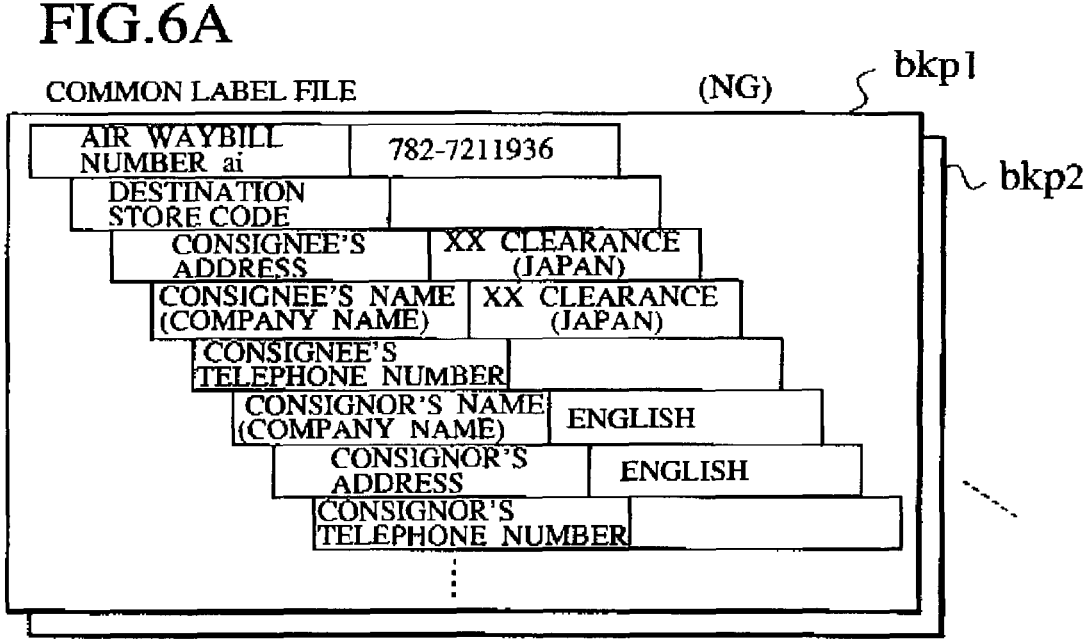
FIGS. 6(a) and 6(b) are views for explaining various types of data stored in the web server.
Figure 6B:
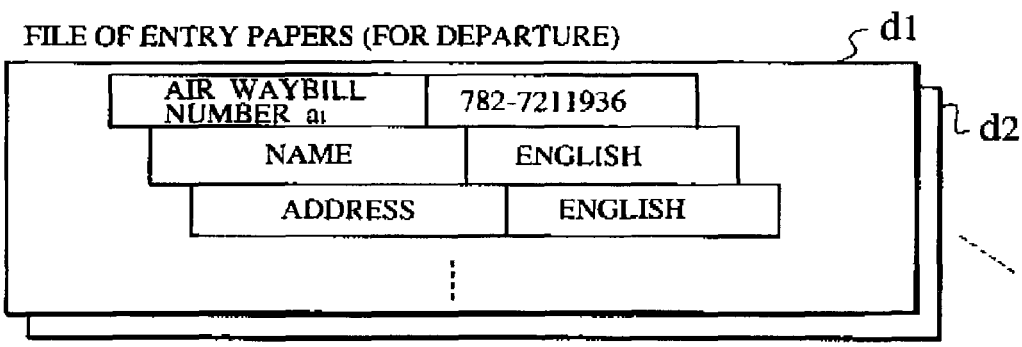

As shown in FIGS. 5 and 6, the web server 18 includes a user file, an air waybill file, a common label file (which hereinafter is referred to as a first common label file) with common label data, partially in Japanese, being stored therein, a common label file (which hereinafter is referred to as a second common label file) with common label data for the clearance in Japan being stored therein and a file for entry papers used for departure from foreign countries.

The user file is formed of, as shown in FIG. 5(*a*), a telephone number, a zip code, an address (written in Japanese), a name (written in Japanese) and a destination office code.

The air waybill file is sent from the overseas business base. As shown in FIG. 5(*b*), the air waybill file is formed of air waybill information (including an air waybill number ai, a consignor's address (written in English), a consignor's name (written in English), a consignor's telephone number and a consignee's address (written in English or Roman character)).

The first common label file is common label data sent from the overseas business base and as shown in FIG. 5(*c*), comprises an air waybill number, a destination store code, a consignee's address (written in Japanese), a consignee's name (written in Japanese), a consignee's telephone number, a consignor's name (written in English) and a consignor's address (written in English).

The second common label file is common label data sent from the overseas business base to the Japanese clearance center. As shown in FIG. 6(*a*), the second common label file is formed of an air waybill number, a destination office code, a consignee's address (address of the clearance of the XX home delivery service in Japan, written in Japanese), a consignee's name (name of the clearance center of the XX home delivery service in Japan, written in Japanese), a consignee's telephone number, a consignor's name (written in English) and a consignor's address (written in English).

Further, the file for entry papers is sent from the overseas business base and comprises, as shown in FIG. 6(*b*), an air waybill number, a name (written in English), an address (written in English), a package type (written in English) and the number of packages. These files are linked with each other by an air waybill number and a telephone number. Specifically, a telephone number master or a zip code master is used for the user information file. Such file data may be generically referred to as data to be accepted.

(Structure of Clearance in Japanese XX Home Delivery Service)

The XX clearance center in the Japanese XX home delivery service includes, as shown in FIG. 4, a PC 20 (which is also referred to as a domestic main terminal), a printer 11 for entry papers and a common label printer 12. An unillustrated communication device (router or the like) is connected to the PC 20. A communication protocol is TCP/IP (Transport Control Protocol/Internet Protocol).

In accordance with an instruction from an operator, the PC 20 accesses the Web server 18 to display the air waybill number ai serving as the data to be accepted on its screen. Further, the data aip of the air waybill Ai, the data bk of the common label Bk, the data bkp of the common label Bkp and the data di of the entry papers Di used for departure relating to the selected air waybill number ai are also displayed on the screen.

The PC also includes character conversion software. In accordance with the character conversion software, when character conversion is instructed for a consignee's address (written in English/Roman character) and a consignee's name (written in English/Roman character) included in the data di of entry papers used for departure, a consignee's telephone number is inputted and then a consignee's address (written in Japanese) and a consignee's name (written in Japanese) can be hit in a telephone number master file or a zip code master file and are converted into a determined name and address written in Roman character. By the character conversion being performed, the data dk of the entry papers Dk can be obtained without error.

In the case of the data bkp of the common label Bkp (i.e., the data obtained when a hit is not found), an operator of the clearance center in the XX home delivery service manually inputs the correct consignee's address and name, and a destination office code on the basis of the data aip of the air waybill Aip from an overseas consignor displayed on a screen and the air waybill Aip. In this way, the common label data bka (i.e., data of a label prepared in Japan) is obtained.

When an additional tax is inputted, the PC 20 adds payment on delivery indicating an additional tax to the data bk of the common label Bk or the data bka of the common label Bka, so that the common label data bka with payment on delivery being added thereto is prepared. The data bk obtained when a hit is found becomes data bka1 when a payment on delivery is allocated, and the data bkp obtained when a hit is not found becomes data bka2 when a payment on delivery is allocated.

The data of these common labels is preferably outputted to and printed by the printers 11 and 12 when a package has arrived in Japan and a worker at an airport scans, by a PDT, a sheet with a barcode of a plurality of air waybills Ai to receive barcode data. Namely, when the package 1*a* has arrived, the common label or the common label Bka is obtained and attached to the package 1*a*.

When it has been informed that the package 1*a* has arrived, the PC 20 sends the aforementioned common label data (bk, bkp, bka), the entry papers, the entry papers used for departure and the air waybill information Ai to a center server 19 as accepted data and stores the same therein. Further, the PC 20 informs the Web server 18 of an air waybill number that has been accepted.

The system of delivery and transport from overseas with the above-described structure will be described hereinafter with reference to sequence views shown in FIGS. 7 and 8.

Figure 7:
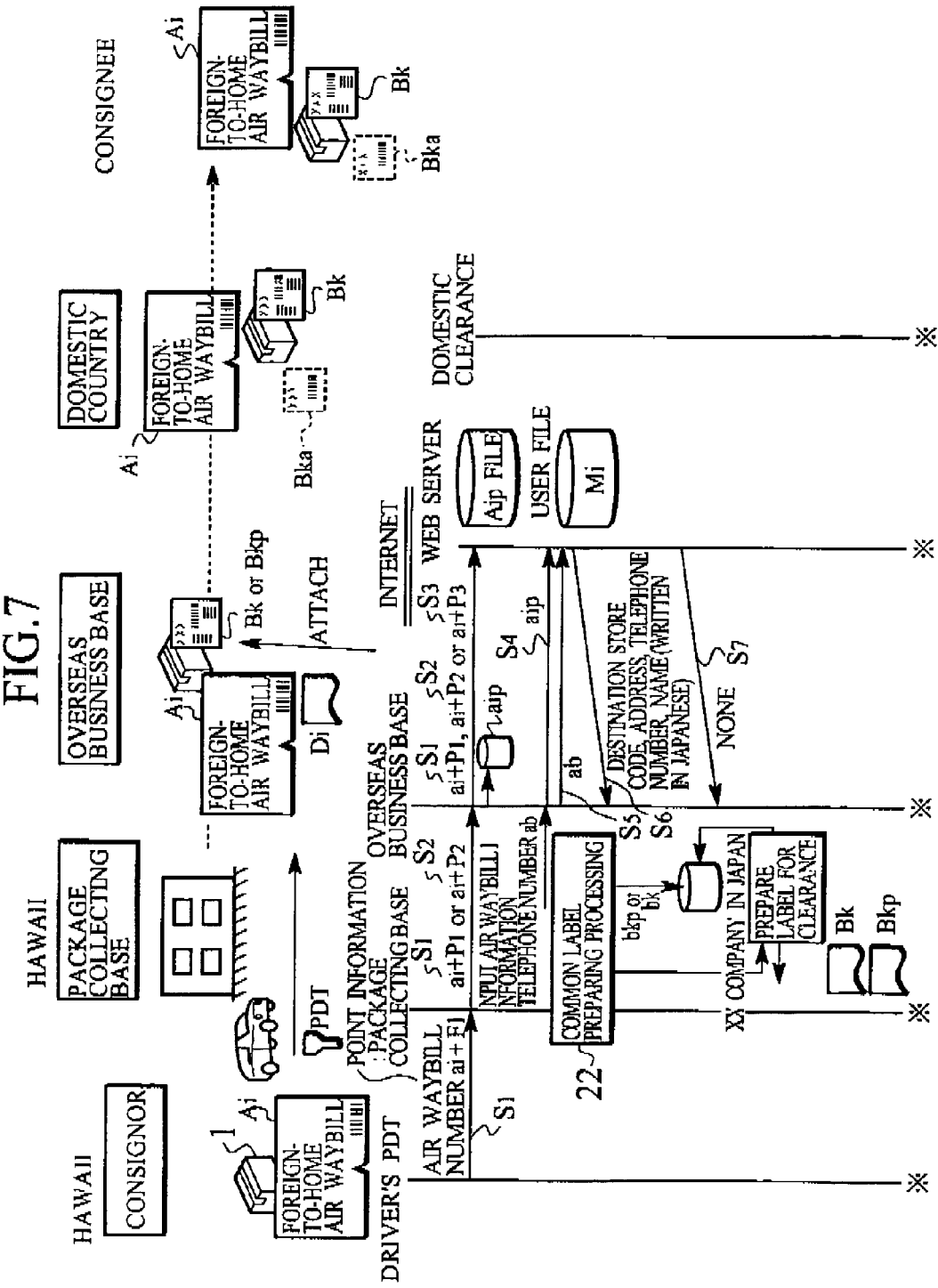
FIG. 7 is a sequence view for explaining the operation of the system relating to this embodiment.
Figure 8:
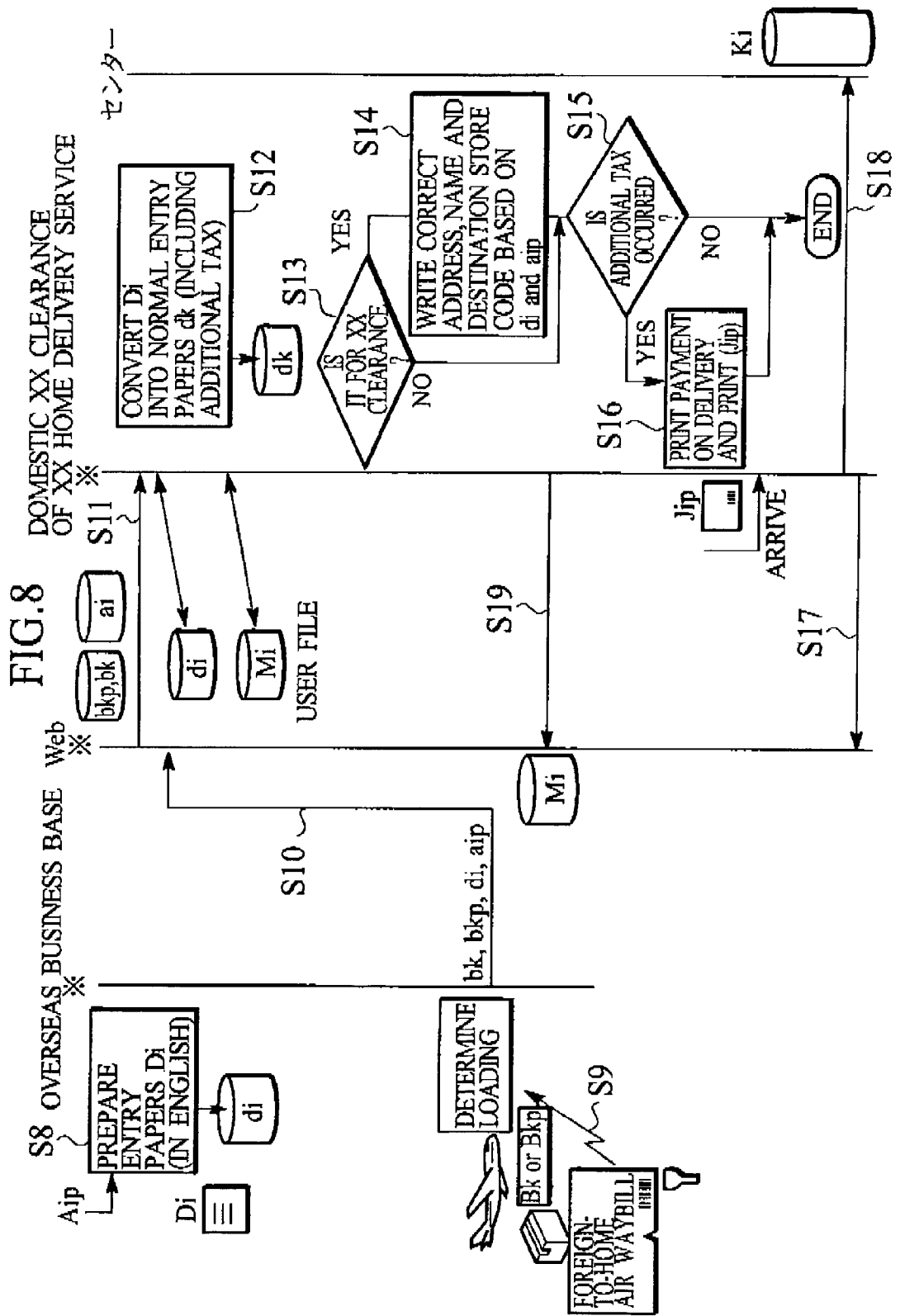
FIG. 8 is a sequence view for explaining the operation of the system relating to this embodiment.

As shown in FIG. 7, a driver who received a package 1 from a consignee operates a PDT to read a barcode. Then, the PDT is connected to a sending device (not shown) provided in a delivery vehicle. The barcode data (including at least an air waybill number) and data P1 (which is also referred to as point information) indicating that the package 1 has been loaded into the delivery vehicle are sent to a package collecting base (S1). When the package collecting base receives such data, the data is sent to the overseas business base. The overseas business base sends such data via the internet to the web server 18. Namely, the driver, the package collecting base and the overseas business base perform mirroring operation, i.e., the data is sent in parallel so as to ensure the safety, and proper transmission of the data.

When the delivery vehicle arrives at the package collecting base, an operator at the package collecting base reads the barcode on the package 1 by a PDT (not shown) at the package collecting base. Then, the PDT is connected to a sending device (not shown) at the package collecting base. The barcode data (including at least an air waybill number) and data P2 indicating that the package 1 has arrived at the package collecting base are sent to the package collecting base (in a wire or wireless manner) (S2). Further, when the package 1 is loaded onto another express vehicle at the package collecting base, a driver of the express vehicle operates a PDT to send the barcode data and data indicating that the package has been loaded into the express vehicle for the overseas business base (not shown).

When the express wagon arrives at the overseas business base, an operator at the overseas business base operates a PDT to send the barcode data and data P3 indicating that the package has arrived at the overseas business base to the internet web server 18 by using a sending device at the overseas business base (S3).

When the package 1 arrives at the overseas business base, an operator at the overseas business base reads a barcode on the copy Aip of the foreign-to-home air waybill Ai attached to the package 1, by the barcode scanner 5. Then, the operator operates a keyboard to input manually a client's (consignor's) address, a client's name, a passport number, a consignee's address, a consignee's name and a consignee's telephone number.

The air waybill data aip consisting of these items is stored in a hard disk in the PC 15 and sent to the internet web server 18 (S4).

In accordance with a consignee's telephone number being inputted, a common label preparing processing 22 is activated. In accordance with the common label preparing processing 22, the telephone number ab is sent by accessing the internet web server (S5), an address and a name written in Japanese linking with the telephone number ab are detected (S6) and the detected items are allocated respectively to a blank for the consignee's address, a blank for the consignee's name and a blank for the destination office code in the common label Ai displayed on a screen (when a hit is found).

Figure 9:
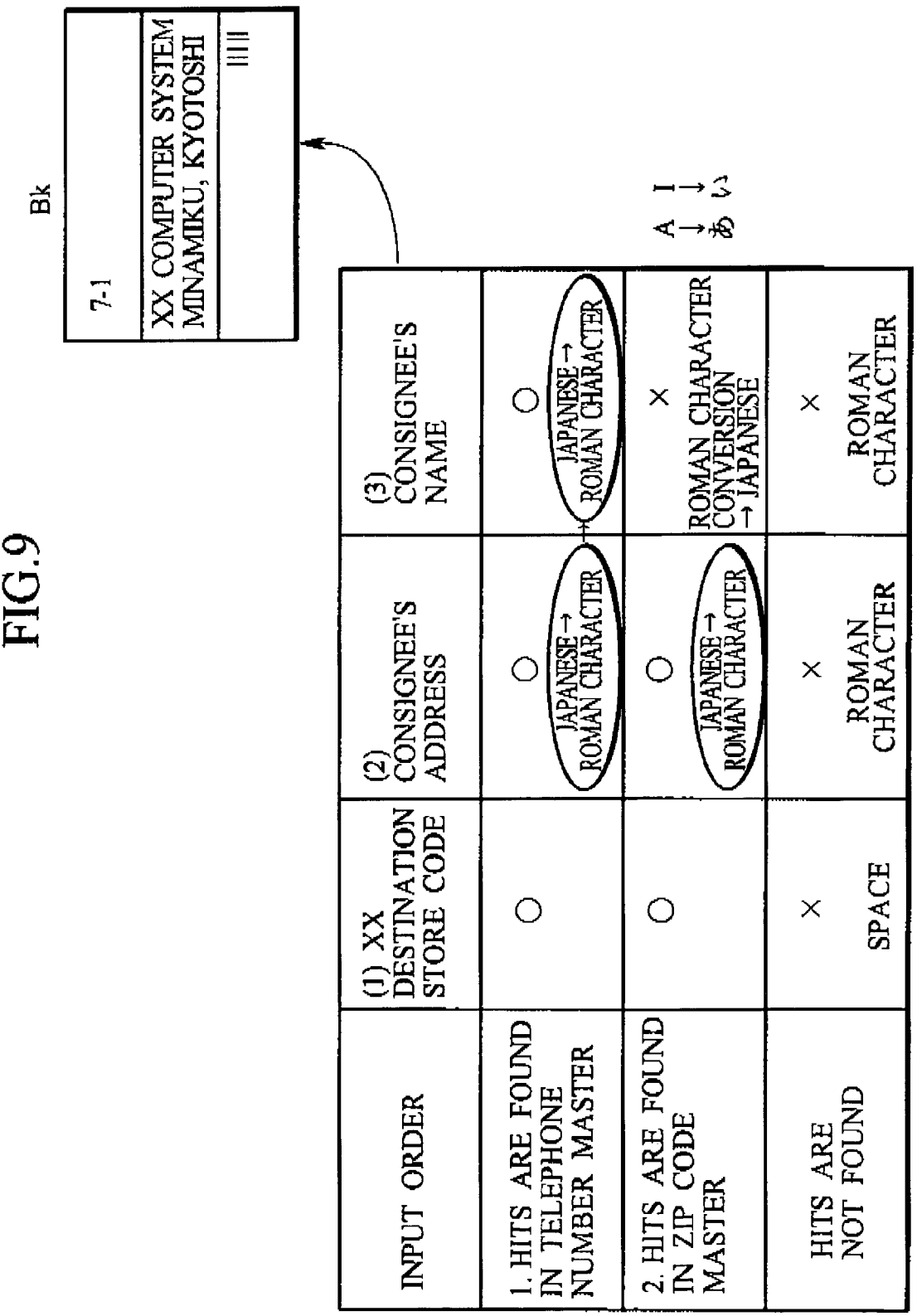
FIG. 9 is a view for explaining a conversion software.

As shown in FIG. 9, a telephone master file serving as a user file in the web server 18 (or a zip code master file) is searched. Then, the hit consignee's address (written in Japanese), consignee's name (written in Japanese) and destination office code are read and allocated. By using the printer 3, the common label Bk as shown in FIG. 7(a) is obtained.

Figure 10B:
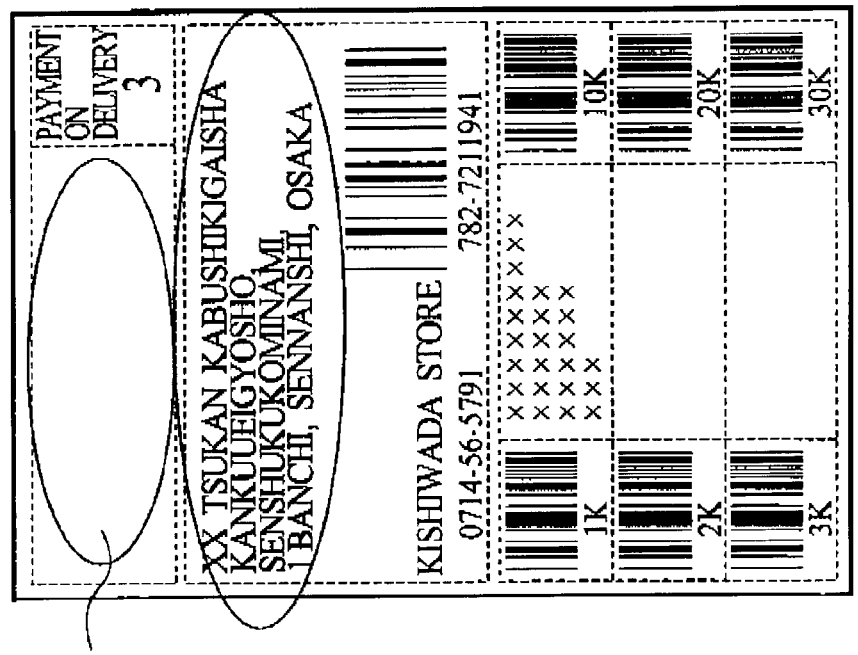
FIGS. 10(a) and 10(b) are views for explaining an overseas common label.
Figure 10A:
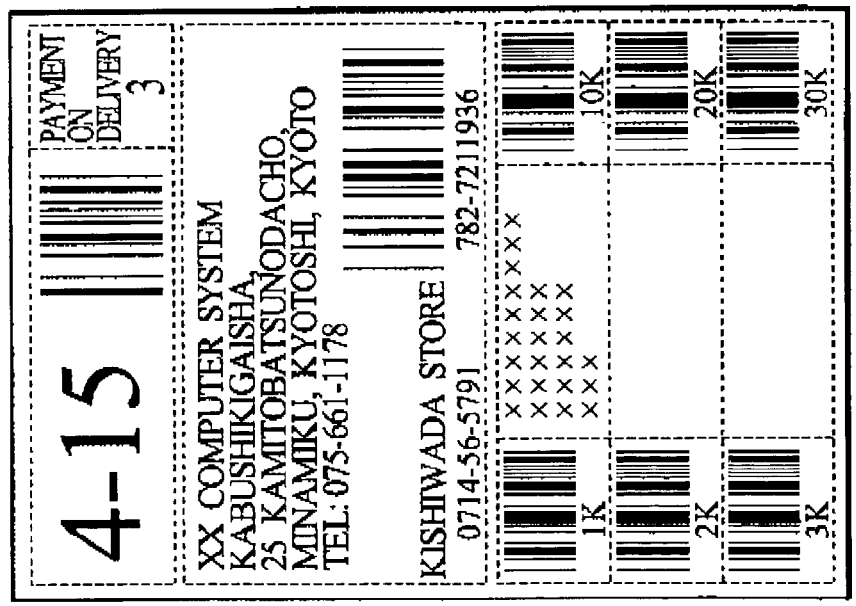

When hits are not found in the web server 18 (S7), an address of the clearance center in the XX home delivery service company (written in Japanese) and its name (written in Japanese) that are stored in advance in a hard disk are allocated respectively to a blank for consignee's address and a blank for consignee's name. Then, by using the printer 3, the common label shown in FIG. 10(b) can be obtained. When the address (written in Japanese) and the name (written in Japanese) of the clearance center of the XX home delivery service company are written, it indicates that maintenance for determining a consignee is required at the clearance center in Japan.

At the PC 15 at the overseas business base, a screen for preparing entry papers used for departure is opened and a predetermined data (including a flight number, a date, a product type, the number of packages, a tax, a consignor's address, a consignor's name, a consignee's address, etc.) is manually inputted on the basis of the contents written in the air waybill Aip to prepare the data di in English of the entry papers Di used for departure (S8). At this time, a barcode on the air waybill Aip is read by a scanner and the air waybill number ai is added to the data of the entry papers Di. Namely, the air waybill number ai is also printed on the entry papers Di used for departure printed by the printer 4 as shown in FIG. 11. The data di of the entry papers Di used for departure is stored in a hard disk.

When a label attached to the package 1a is printed and outputted from the system, an outputted date is stored in a hard disk. The point information (indicating that a package has been loaded into an airplane) is created based on this information (S9).

The PC 15 at the overseas business base which has received this information sends the air waybill data aip, the data di of entry papers used for departure and the common label data bk (or bkp) to the internet web server 18 (S10). The protocol used in this case is an Internet Protocol. An air waybill number is added to all data sent (aip, di, bk and bkp).

The above-described common label preparation processing 22 will be described with reference to a flowchart shown in FIG. 12.

In accordance with the common label preparing processing 22, a group of air waybill numbers stored in a hard disk are displayed on a screen and the air waybill data aip relating to the top air waybill number is displayed (S30).

Next, a format screen for preparing a common label is opened. Then, among the displayed air waybill data aip, required data (consignee's address, name and telephone number written in English) is allocated to predetermined blanks in the input format for preparing a common label. Namely, a common label is partially prepared (in English) (S31).

Then, a telephone number ab of a consignee in an air waybill is inputted (S32). In accordance with the telephone number ab being inputted, the common label preparation processing 22 activates communication software and accesses the web server 18 to transfer the user data relating to the telephone number ab (S33). When the web server 18 has a telephone number master file, the consignee's name and address (written in Japanese) and a destination office code relating to the telephone number ab are transferred.

The common label preparation processing 22 determines whether the user data is transferred (S34). If it is determined that the user data is transferred, the user data relating to the telephone number ab is temporarily stored in a hard disk (S35).

Next, an item for determination is set (S36). For example, a consignee's address may be set as an item for determination.

It is determined whether the information about the item for determination exists in the transferred user data (i.e., it is determined whether hits are found) (S37).

If it is determined in step S37 that hits are found in the information of the item for determination, hit information (e.g., a consignee's address, a consignee's name or a destination office code) is pasted onto the respective blanks in a format for preparing the common label and displayed (S38).

Next, it is determined wither another item for destination exists (step S39). If it is determined that another item for destination exists, an item for destination is updated (S40) and the process returns to step S36. For example, a consignee's name (written in Japanese) may be set as the next item for destination.

On the other hand, if it is determined in step S37 that hits are not found in the information of the item for determination, an address, a telephone number and a name of the XX home delivery service company in Japan that are previously stored are read. These items are allocated to a blank for an address and a blank for a name in the format for the common label, respectively (S41).

If it is determined in step S39 that another item for destination does not exist (i.e., when the data bk of the common label format is produced on the basis of the hit information or when the data bkp of the input format for the common label is produced by inputting the Japanese XX home delivery service company's address, name and telephone number), common label data with a part of the items being written in Japanese is stored in a hard disk (S42). Then, printing is performed by the printer 3 (S43). At this time, an air waybill number and a barcode are also printed.

Namely, when hits are found, the common label Bk can be created. When hits are not found, the common label Bkp can also be created. Either of the labels is attached to the package 1.

When hits are found, a new label does not need to be prepared in the Japanese clearance center. Consequently, operational efficiency can be improved and the time required for a package to be received by a consignee can be reduced.

An operator of the clearance center of the XX home delivery service in Japan operates the PC 20 to access the internet web server 18 (to log in the internet web server 18 by inputting an ID code and a password). Then, the air waybill number ai to be accepted is displayed on a screen. The air waybill data aip, the data di for entry papers and the common label data bi (bk or bkp) relating to this air waybill number ai are transferred (SI 1) and then the data dk of the entry papers is produced (S12) as follows.

Figure 13:
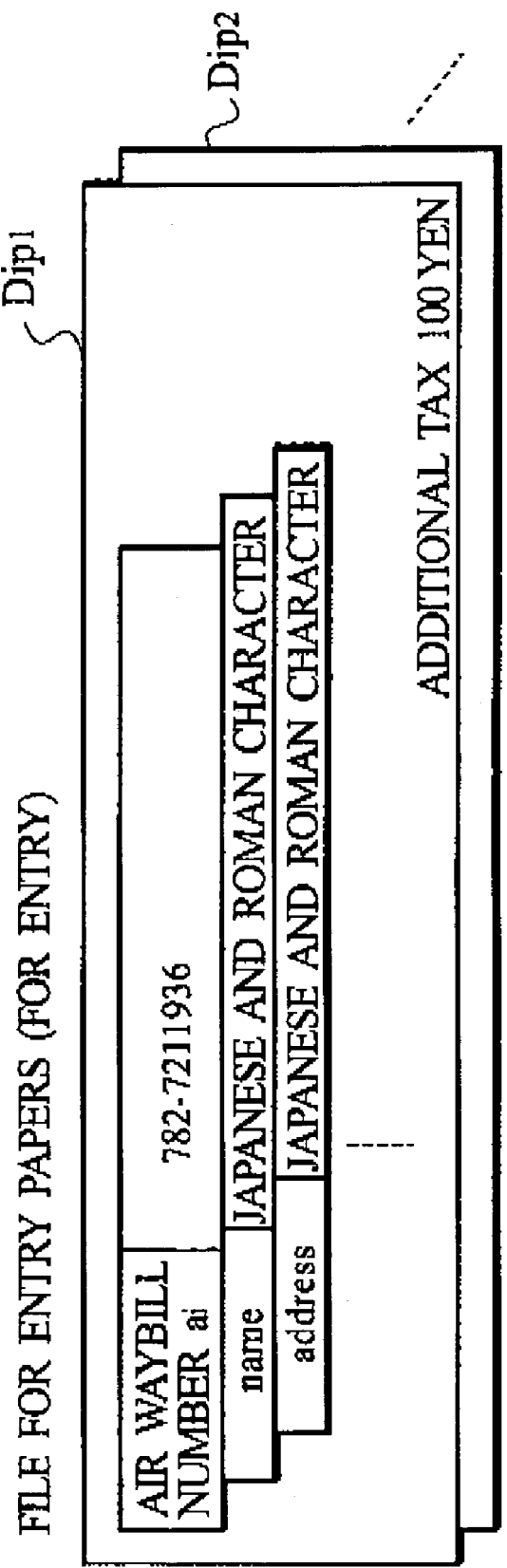
FIG. 13 is a view for explaining data of the entry papers stored in the web server.

A format screen for entry papers is opened and character conversion software is activated. When an address (written in Roman character) written in a blank for an address in the data di of the entry papers on the screen is designated to be converted, the character conversion software recognizes each character string and then converts into Roman character stored in advance in correspondence with the recognized character string. The resultant data is stored in a hard disk as the data dk of the entry papers. A file for entry papers is structured as shown in FIG. 13.

For example, when the address reads "TOUKYOU", such character string is converted into "TOKYO". If it is determined by an operator that conversion needs not to be performed, a conversion processing is not performed.

When the operator determines that an additional tax is required from the data di of the entry papers, data of this additional tax is written into the data dk of the entry papers.

Since the entry papers are sent to the internet web server and stored therein, an operator (or a registered customs specialist) of the clearance center of the XX home delivery service in Japan confirms the entry papers used for departure on the internet web server 18 and then can easily prepare the entry papers.

The operator determines whether a consignee in a common label displayed on the screen of the PC 20 is the clearance center of the XX home delivery service company in Japan (S13). If the determination in step S13 is "yes", the common label preparing processing (not shown) is activated.

If the determination in step S13 is "yes", the operator displays an input format for the common label on a screen and manually inputs the correct address, name, and telephone number of consignee and a destination office code on the basis of the air waybill data aip and the data for entry papers to produce the correct common label data bka2. This data is printed by the printer 12 (S14).

Figure 14C:
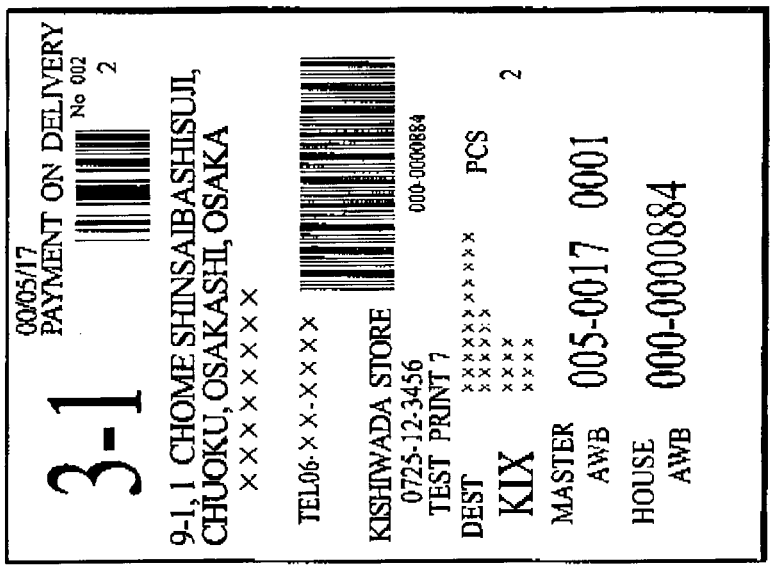
FIGS. 14(a) through 14(c) are views for explaining a common label prepared in Japan.
Figure 14A:
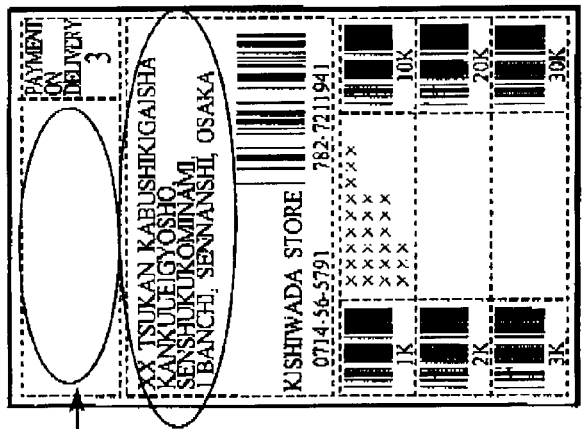
Figure 14B:
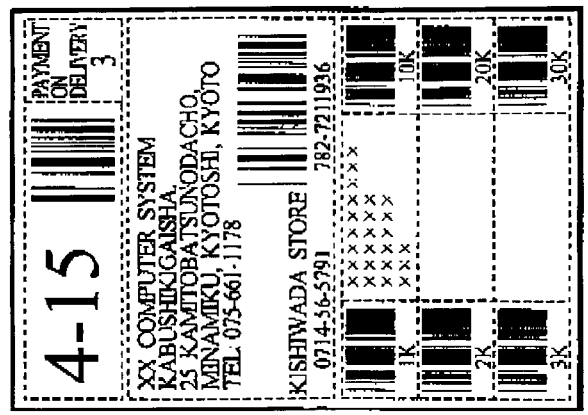

Further, the operator determines whether an additional tax exists (S15). If an additional tax exists, common label data obtained by printing the payment on delivery on the common label data bk, bka 1 is produced and then printed (S16). Namely, as shown in FIG. 14(*a*), when the address of the clearance center is written, a common label with the correct address and destination office code being added thereto can be obtained as shown in FIG. 14(*b*). When an additional tax exists, a common label with payment on delivery being printed thereon can be obtained as shown in FIG. 14(*c*). Here, FIG. 14(*c*) shows a common label when a hit is found.

Then, when an airplane and freight thereon also arrives, a MASTER-AWB (unit of mixed loading) number and a HOUSE-AWB (unit of freight) number are manually inputted to the system.

Next, the web server is informed that the data for the entry papers, the air waybill data and the common label data are accepted data. This is performed by adding a code indicating that data to be accepted is accepted data to the air waybill number (S17). The entry papers data, the air waybill data and the common label data are sent to the center as accepted data (S18).

When a consignee of a common label is the Japanese clearance center and the correct consignee's address, name, telephone number and a destination office code have been inputted, such data is added as new client data to the user file on the Web server (S19).

Accordingly, in the overseas business base, three overseas labels are not prepared as in conventional cases, instead, one common label as shown in FIG. 14(*c*) is prepared. Further, entry papers used for departure are prepared and sent to the internet Web server. The clearance center at the entry side accesses the internet Web server and makes the common label and the entry papers used for departure transfer. Thus, when packages are sent from foreign countries, the entry papers are prepared in the Japanese clearance center only in special cases (in cases that the address is the clearance center's address, an additional tax exists and character conversion is required). As a result, the time required for a Japanese consignee to receive a package can be reduced and costs can also be reduced. Since only one label suffices, labor and cost for preparing labels can be reduced.

In accordance with the above-described embodiment, a common label is prepared when packages are delivered from foreign countries to Japan. When user files for overseas consignees (an address, a name and a destination office code are written in English) are prepared, common labels for overseas consignees may be prepared when packages are sent from Japan to foreign countries.

Although delivery by airplanes has been described in the above-described embodiment, when shipping, common labels for shipping packages may also be provided.

INDUSTRIAL APPLICABILITY

As described above, in accordance with the invention of claim 1, an overseas main terminal and a domestic main terminal are connected via a network to a server. The overseas main terminal reads identification information (telephone number or the like) for identifying a consignee written in an air waybill of a package and sends the same to the server. The server provides predetermined information (including an address, a name and a destination office code written in a domestic language) that relates to the identification information and is stored in advance. The predetermined information is allocated to data of a label for delivering to the consignee. The resultant data is printed as a common label.

Namely, as a common label for a consignee written in a domestic language is prepared in an overseas business base of XX company, a new domestic label dose not need to be prepared in the clearance center in the XX company. Thus, the time required for a package to be received by a consignee can be reduced and costs can also be reduced because a label dose not need to be prepared in Japan.

In accordance with the invention of claim 1, the overseas main terminal and the domestic main terminal are connected to the server via a network. The domestic main terminal reads the identification information (telephone number or the like) for identifying a consignee written in an air waybill of a package and sends the same to the server. The server provides predetermined information from overseas (including an address, a name and a destination office code written in a language of a country to be entered) relating to the identification information. Then, the predetermined information is allocated to the data for a label for transporting to the consignee and resultant data is printed as a common label.

As a common label for a consignee written in a foreign language is prepared in a domestic business base in XX company, a label for a consignee in a domestic country does not need to be newly prepared in the overseas business base (the clearance center) in XX company. Thus, the time for a package to be received by the consignee in a domestic country can be reduced and costs can also be reduced.

Conventionally, three types of labels (a label with MASTER AMB No. being written therein, a label with a HOUSE AMB No. being written therein and a label with consignee information in Japanese being written therein) are required as a label attached to a package from overseas. In accordance with the present invention, however, three labels are integrated as one label. As a result, a reduction in costs and an improvement in operational efficiency can be accomplished.

In accordance with the invention of claim 2, the overseas main terminal sends data of entry papers used for departure (written in English) to which an identification code of the air waybill information of a package is added to the server and is stored therein. When the identification code of the air waybill is sent from the domestic main terminal, the air waybill data and the data of entry papers are provided to the domestic main terminal. Thus, in a domestic country, the air waybill data and the data of entry papers are confirmed and if corrections are not required, the entry papers used for departure may be used as entry papers.

Thus, as a domestic label and entry papers need not be prepared in a domestic country, the time required for a package to be received by a consignee can be reduced and costs can also be reduced.

In accordance with the invention of claim 3, when predetermined information which relates to the identification information for identifying a consignee is written in a domestic language and is not sent from the server, a common label for the domestic business base of that address and name of the domestic business base stored in advance and written in a domestic language are allocated to the label data is provided. Then, the data of the common label for the domestic business base is sent to the server.

Thus, even if a consignee's address, a consignee's name and a destination office code written in the language of a consignee's country are not known in the overseas business base because the consignee is a new consignee, a package is delivered to the consignee's country. Then, in the country, a common label including the correct consignee's address, name and a destination office code written in the language of the consignee's country can be prepared.

In accordance with the invention of claim 4, the air waybill data, the common label data and the data of entry papers are sent to the server when it is informed that packages have left an airport or a harbor. Thus, in accordance with the effects of the present invention, packages can be received in accordance with Immigration Laws by the exchange of electronic data.

In accordance with the invention of claim 5, for the data of the common label for a domestic business base, the domestic main terminal prepares a common label in which a consignee's address, a consignee's name and a destination office code are written on the basis of the air waybill information. Thus, a package can be delivered to a correct consignee.

In accordance with the invention of claim 6, even in the case of a new consignee, the data of the common label for the correct consignee is sent to the server and added as new client data. Thus, for the next time of shipping, the time required for the consignee to receive a package can be reduced and costs can also be reduced.

In accordance with the invention of claim 7, when an additional tax is determined by confirming the data of entry papers used for departure, the domestic main terminal allocates a sign indicating that an additional fee must be paid because of the additional tax added to the common label data and prints the data. Thus, an additional fee can be reliably paid from a consignee without issuing a new slip.

In accordance with the invention of claim 8, the server is a distributed database system in which information is represented in a hypertext format. The respective data are linked by using pointers as air waybill numbers. The respective main terminals and the server conduct communications by the TCP/IP protocol.

Thus, if desired, an air waybill, entry papers, a common label and client information can be easily obtained at overseas and domestic business bases in the same manner as sending and receiving e-mail.

The invention claimed is:

1. An overseas delivery and transport system located at an airport or a harbor, comprising:

a server;

an overseas main terminal connected to the server via a network at an overseas business base of a home delivery service; and a domestic main terminal connected to the server via the network at a domestic business base of the home delivery service, wherein the overseas main terminal comprises:

means for reading consignee identification information written on an air waybill of a package to identify a consignee for sending the consignee identification information to the server, and for receiving predetermined information written in a domestic language related to the consignee identification information from the server, means for reading air waybill data written on the air waybill, and for sending the air waybill data to the server, means for sending data of entry papers used for departure of the package to the server, the data of the entry papers prepared based on the air waybill data and including an identification code written on the air waybill, and means for preparing common label data to transport the package to the consignee by allocating the predetermined information received from the server and the identification code written on the air waybill, and for printing the common label data as a common label for the overseas business base;

the domestic main terminal comprises:

means for reading the identification code written on the air waybill of the package, for sending the identification code to the server, and for receiving the data of the entry papers used for departure of the package and the common label data from the server, means for allocating a sign that an additional fee must be paid to the common label data when an additional tax is charged by confirming the data of the entry papers used for departure of the package, and for printing the common label data as a common label for the domestic business base, and means for preparing and printing data of the entry papers of the package by adding the additional tax to the data of the entry papers used for departure of the package; and the server comprises:

means for storing the air waybill data, the data of the entry papers used for departure, and the common label data sent from the overseas main terminal by association with the identification code of the air waybill, means for sending the stored predetermined information including an address of the consignee and a destination office code of the package to the overseas main terminal by receiving the consignee identification information, and means for sending the air waybill data, the data of the entry papers used for departure, and the common label data to the domestic main terminal upon receipt of the identification code of the air waybill.

2. The overseas delivery and transport system according to claim 1, wherein when no predetermined information written in the domestic language related to the consignee identification information for identifying the consignee is transferred from the server, the overseas main terminal provides and prints common label data for the domestic business base by allocating an address and name of the domestic business base written in the domestic language and stored in advance, and sends the common label data for the domestic business base to the server.

3. The overseas delivery and transport system according to claim 2, wherein the overseas main terminal searches the air waybill data, the common label data, and the data of entry papers used for departure relating to the identification code, and sends the resultant data to the server when the overseas main terminal is informed that the package has left the airport or the harbor in a foreign country and the identification code of the air waybill is inputted to the overseas main terminal.

4. The overseas delivery and transport system according to claim 3, the domestic main terminal further comprising:

means for sending the identification code of the air waybill to the server, and for providing the air waybill data, the common label data, the common label data for the domestic business base, and the data of the entry papers used for departure relating to the identification code of the air waybill when the domestic main terminal is informed that the package has arrived at the airport or the harbor in a home country; and means for obtaining the common label data for a correct consignee including the consignee's address, name, and the destination office code based on the air waybill data and written in the domestic language that are allocated to predetermined blanks in the common label respectively, and for printing the resultant data when the common label is for the domestic business base.

5. The overseas delivery and transport system according to claim 4, wherein the common label data for the correct consignee is sent to the server and newly stored therein as client data.

6. A method of sending a package overseas, comprising:

reading consignee identification information written on an air waybill of the package to identify a consignee and sending the consignee identification information to a server;

receiving predetermined information written in a domestic language related to the consignee identification information from the server;

reading air waybill data written on the air waybill and sending the air waybill data to the server;

sending data of entry papers used for departure of the package to the server, the data of the entry papers prepared based on the air waybill data and including an identification code written on the air waybill;

preparing common label data to transport the package to the consignee by allocating the predetermined information received from the server and the identification code written on the air waybill, and printing the common label data as a common label for the overseas business base;

reading the identification code written on the air waybill of the package, sending the identification code to the server, and receiving the data of the entry papers used for departure of the package and the common label data from the server;

allocating a sign that an additional fee must be paid to the common label data when an additional tax is charged by confirming the data of the entry papers used for departure of the package, and printing the common label data as a common label for the domestic business base;

preparing and printing data of the entry papers of the package by adding the additional tax to the data of the entry papers used for departure of the package;

storing the air waybill data, the data of the entry papers used for departure, and the common label data sent from the overseas main terminal by association with the identification code of the air waybill;

sending the stored predetermined information including an address of the consignee and a destination office code of the package to the overseas main terminal by receiving the consignee identification information; and sending the air waybill data, the data of the entry papers used for departure, and the common label data to the domestic main terminal upon receipt of the identification code of the air waybill.

7. The method according to claim 6, wherein when no predetermined information written in the domestic language related to the consignee identification information for identifying the consignee is transferred from the server, the overseas main terminal provides and prints common label data for the domestic business base by allocating an address and name of the domestic business base written in the domestic language and stored in advance, and sends the common label data for the domestic business base to the server.

8. The method according to claim 7, wherein the overseas main terminal searches the air waybill data, the common label data, and the data of entry papers used for departure relating to the identification code, and sends the resultant data to the server when the overseas main terminal is informed that the package has left an airport or a harbor in a foreign country and the identification code of the air waybill is inputted to the overseas main terminal.

9. The method according to claim 8, further comprising:

sending the identification code of the air waybill to the server, and providing the air waybill data, the common label data, the common label data for the domestic business base, and the data of the entry papers used for departure relating to the identification code of the air waybill when the domestic main terminal is informed that the package has arrived at the airport or the harbor in a home country; and obtaining the common label data for a correct consignee including the consignee's address, name, and the destination office code based on the air waybill data written in the domestic language that are allocated to predetermined blanks in the common label respectively, and printing the resultant data when the common label is for the domestic business base.

10. The method according to claim 9, wherein
the common label data for the correct consignee is sent to the server and newly stored therein as client data.

11. A delivery and transport system, comprising:
a server including predetermined information related to a consignee; and
a main terminal connected to the server via a network at a main business base, the main terminal comprising:
   an input unit configured to receive air waybill data including consignee identification information written on an air waybill of a package to be shipped internationally, and configured to send the air waybill data to the server,
   a reading unit configured to read the consignee identification information to identify a consignee for sending the consignee identification information to the server, and configured to receive the predetermined information written in a domestic language related to the consignee identification information from the server,
   a first preparation unit configured to prepare entry papers used for departure of the package based on the air waybill data and to send data of the entry papers to the server, the data of the entry papers is prepared based on the air waybill data and includes an identification code written on the air waybill,
   a tax unit configured to determine if an additional tax is required at a destination of the package and to indicate that the additional tax is required,
   a second preparation unit configured to prepare common label data to transport the package to the consignee by allocating the predetermined information received from the server and the identification code written on the air waybill, and configured to print the common label data as a common label, including the indication that the additional tax is required; and
the server comprises:
   a storing unit configured to store the air waybill data, the data of the entry papers used for departure, and the common label data received from the main terminal by association with the identification code of the air waybill, and
   a sending unit configured to send the predetermined information including an address of the consignee and a destination office code of the package to the main terminal upon receipt of the consignee identification information, and configured to send the air waybill data, the data of the entry papers used for departure, and the common label data to an international terminal upon receipt of the identification code of the air waybill, wherein
at the international terminal, the identification code written on the air waybill of the package is read and sent to the server, and in response, the server sends the data of the entry papers used for departure of the package and the common label data to the international terminal, and
based on the data of the entry papers and the common label data received from the servers, entry papers including any additional tax and a common label for an international business base can be printed.

* * * * *